US011859069B2

(12) United States Patent
Gaefke et al.

(10) Patent No.: US 11,859,069 B2
(45) Date of Patent: Jan. 2, 2024

(54) REACTIVE AMINE ACCELERATOR, A REACTIVE RESIN CONTAINING SAID ACCELERATOR, AND THE USE THEREOF

(71) Applicant: Hilti Aktiengesellschaft, Schaan (LI)

(72) Inventors: Gerald Gaefke, Kaufbeuren (DE); Beate Gnass, Gersthofen (DE)

(73) Assignee: Hilti Aktiengesellschaft, Schaan (LI)

( * ) Notice: Subject to any disclaimer, the term of this patent is extended or adjusted under 35 U.S.C. 154(b) by 218 days.

(21) Appl. No.: 17/272,428

(22) PCT Filed: Sep. 9, 2019

(86) PCT No.: PCT/EP2019/073919
§ 371 (c)(1),
(2) Date: Mar. 1, 2021

(87) PCT Pub. No.: WO2020/053114
PCT Pub. Date: Mar. 19, 2020

(65) Prior Publication Data
US 2021/0332217 A1    Oct. 28, 2021

(30) Foreign Application Priority Data

Sep. 14, 2018 (EP) ..................... 18194457

(51) Int. Cl.
*C08K 5/18* (2006.01)
*C08K 3/013* (2018.01)
*C08G 59/68* (2006.01)

(52) U.S. Cl.
CPC .............. *C08K 5/18* (2013.01); *C08G 59/686* (2013.01); *C08K 3/013* (2018.01)

(58) Field of Classification Search
CPC ....................................................... C08K 5/18
See application file for complete search history.

(56) References Cited

U.S. PATENT DOCUMENTS 4,243,763 A    1/1981    Argentar
5,854,305 A    12/1998   Schwiegk et al.

FOREIGN PATENT DOCUMENTS

| CN | 1148075   | 4/1997  |
| CN | 105102499 | 11/2015 |
| DE | 43 36 451 | 4/1995  |
| DE | 195 31 649| 3/1997  |

OTHER PUBLICATIONS

International Search Report dated Oct. 24, 2019 in PCT/EP2019/073919 with English translation, 5 pages.
Written Opinion dated Oct. 24, 2019 in PCT/EP2019/073919 with English translation, 6 pages.

*Primary Examiner* — Megan McCulley
(74) *Attorney, Agent, or Firm* — Grüneberg and Myers PLLC

(57) ABSTRACT

A reactive amine accelerator is prepared by reacting a primary or secondary aromatic amine with a diglycidyl ether and an α,β-unsaturated carboxylic acid. The reactive amine accelerator can be used in a reactive resin, in particular based on an epoxy (meth)acrylate resin or a urethane (meth) acrylate resin. A reactive resin composition, in particular based on epoxy (meth)acrylate resin and urethane (meth) acrylate resin, which has an amine accelerator is useful. The amine accelerator is covalently incorporated into the polymer network.

19 Claims, No Drawings

REACTIVE AMINE ACCELERATOR, A REACTIVE RESIN CONTAINING SAID ACCELERATOR, AND THE USE THEREOF

CROSS-REFERENCE TO RELATED APPLICATIONS

This application is the National Stage entry under § 371 of International Application No. PCT/EP2019/073919, filed on Sep. 9, 2019, and which claims the benefit of European Application No. 18194457.0, filed on Sep. 14, 2018. The content of each of these applications is hereby incorporated by reference in its entirety.

BACKGROUND OF THE INVENTION

Field of the Invention

The present invention relates to a reactive amine accelerator, which is prepared by reacting a primary or secondary aromatic amine with an epoxide and an α,β-unsaturated carboxylic acid, and the use thereof in a reactive resin composition. Said invention further relates to a reactive resin composition, in particular an epoxy (meth)acrylate resin composition which has an amine accelerator according to the invention. The amine accelerator according to the invention is covalently incorporated into the polymer network during the curing of the reactive resin.

Description of Related Art

The use of chemical fastening agents based on radically curable resins has long been known. In the field of fastening technology, the use of resins as an organic binder for the chemical fastening technology, e.g. as a constituent of a dowel mass ("chemical dowel"), has become accepted. Dowel masses of this kind are composite materials which are packaged as multicomponent systems, usually two-component systems, one component (the reactive resin component) containing the radically curable resin and the other component (the hardener component) containing an initiator (for radical formation). Other common constituents such as additives, fillers, accelerators, inhibitors, solvents, and reactive diluents can be contained in one and/or the other component. By mixing the two components, the curing reaction, i.e. the polymerization, is initiated by radical formation and the resin is cured to obtain duromer.

In conventional reactive resin components, epoxy (meth)acrylate resins which can be obtained by reacting epoxide, e.g. bisphenol A diglycidyl ether (BADGE), with α,β-unsaturated carboxylic acid, e.g. methacrylic acid, or urethane (meth)acrylate resins which can be obtained by reacting diisocyanate, e.g. methylene diphenyl isocyanate (MDI), with hydroxylalkyl (meth)acrylate, e.g. hydroxypropyl (meth)acrylate, are usually used inter alia as radically curable resins. Epoxy (meth)acrylate resins or urethane (meth)acrylates are usually cured radically or using radiation. Peroxides such as diacetyl peroxide, hydroperoxides or peroxy esters are typically added as the radical source for the radical hardening. Stable peroxides are preferred due to the long shelf life thereof, however, said peroxides only form radicals at elevated temperatures by means of thermal decomposition. In order to enable curing at room temperature, it is necessary to accelerate the peroxide decomposition and the radical formation using additives, i.e. to add what is referred to as an accelerator.

Salts or complexes of transition metals (Cu, V, Co, Mn, Fe, etc.) or tertiary aromatic amines used as additives in the resins are usually used as accelerators of this kind. Said accelerators generally have the disadvantage that they are not harmless in terms of health or do not exhibit the necessary performance or storage stability. In addition, the commercial availability of tertiary aromatic amines which are suitable as accelerators is limited.

For chemical dowels which are free of labeling, some tertiary aromatic amines cannot be used as accelerators due to the health hazard they pose and the labeling requirement associated therewith.

In WO 12/164020 A1 (DSM) a tertiary aromatic amine, specifically N,N-diisopropanoltoluidine, which is bonded to urethane functional groups by the oxygen atoms ("UMA-bound DiPpT"), is added to the resin as an accelerator, in order to improve the curing during air access.

There is therefore a need for a reactive resin which contains an accelerator containing amino groups, which is less harmful to health than the previously used tertiary aromatic amines and nevertheless imparts the required storage stability and performance to the resin.

SUMMARY OF THE INVENTION

This problem is solved by the resins described herein and the reactive amine accelerators used in said resins. A reactive resin containing the amine accelerator according to the invention, and the reactive resin component (A) according to the invention that contains this reactive resin, and the reactive resin system according to the invention that comprises this reactive resin component as a component, are characterized in particular in that the amine accelerator according to the invention is almost completely incorporated into the polymer network during radical curing, due to the olefinic groups. This largely or completely prevents a diffusion of the amine accelerators onto the surface of the cured materials. Another positive effect of using the reactive amine accelerators, which are described herein, as a constituent of a reactive resin can be a slowed sedimentation rate and therefore an improved shelf life in comparison to conventional reactive resins.

DETAILED DESCRIPTION OF THE INVENTION

Although a reactive amine accelerator according to the invention is added to the reactive resin as an additive, said accelerator is covalently incorporated into the cured resin during the curing thereof. This is made possible by the reactive amine accelerator according to the invention being synthesized by reacting a primary or secondary aromatic amine with an epoxide and an α,β-unsaturated carboxylic acid. The reactive amine accelerator according to the invention that results from this synthesis contains either one or two terminal α,β-unsaturated carboxylic acid esters. These then react with the other monomers during the curing of a reactive resin, and, as a result, the reactive amine accelerator according to the invention is incorporated into the resin backbone. As a result, the reactive amine accelerator according to the invention is less harmful to health than the tertiary amines which were used previously.

The resin mixture according to the invention that is prepared in this manner (hereinafter also referred to as "reactive resin") cures at room temperature by mixing with a radical initiator, such as dibenzoyl peroxide, which has a high maximum reactivity temperature $T_{max}$, even without the addition of further accelerators.

In contrast with WO 12/164020 A1, the tertiary structure of the amine accelerator is formed in a resin according to the invention during the reaction of a primary or secondary aromatic amine with an epoxide and an α,β-unsaturated carboxylic acid. As a result, asymmetrical structures and structures which don't have chain lengthening, for example, are also possible via secondary amines.

The amine accelerator according to the invention—also referred to as "reactive amine accelerator" in the following and as "accelerator" further below—is formed by reacting a primary or secondary aromatic amine with a diglycidyl ether and an α,β-unsaturated carboxylic acid. In this synthesis, (1) an aromatic primary or secondary amine is reacted with (2) a diglycidyl ether of the formula shown in the following reaction scheme and (3) an α,β-unsaturated carboxylic acid. The reaction typically takes place in the presence of (4) a catalyst. (5) an inhibitor can optionally be present in the reaction mixture. A schematic representation of the reaction is as follows:

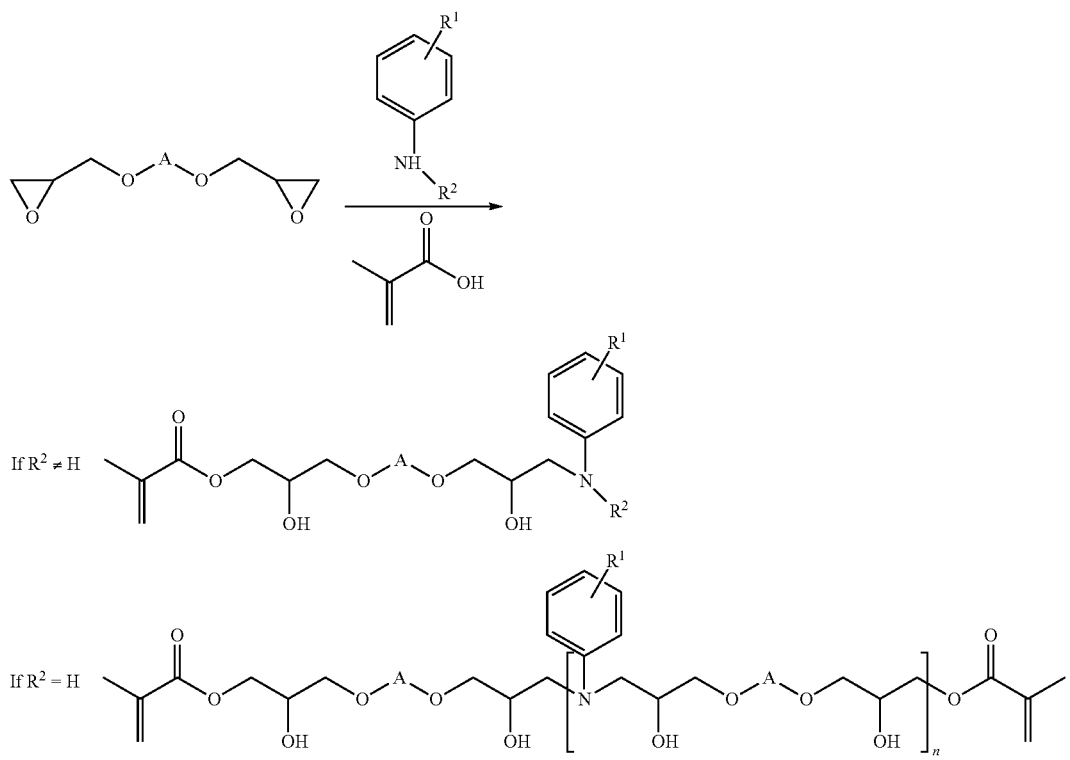

The phenyl ring in this case is a placeholder for an aromatic functional group. In a preferred embodiment, this aromatic functional group is a phenyl ring or naphthyl ring, more preferably a phenyl ring. The meaning of placeholders A, $R^1$, $R^2$ and n is described further below.

An exemplary synthesis according to the invention with a primary aromatic amine (here: para-toluidine) takes place as follows:

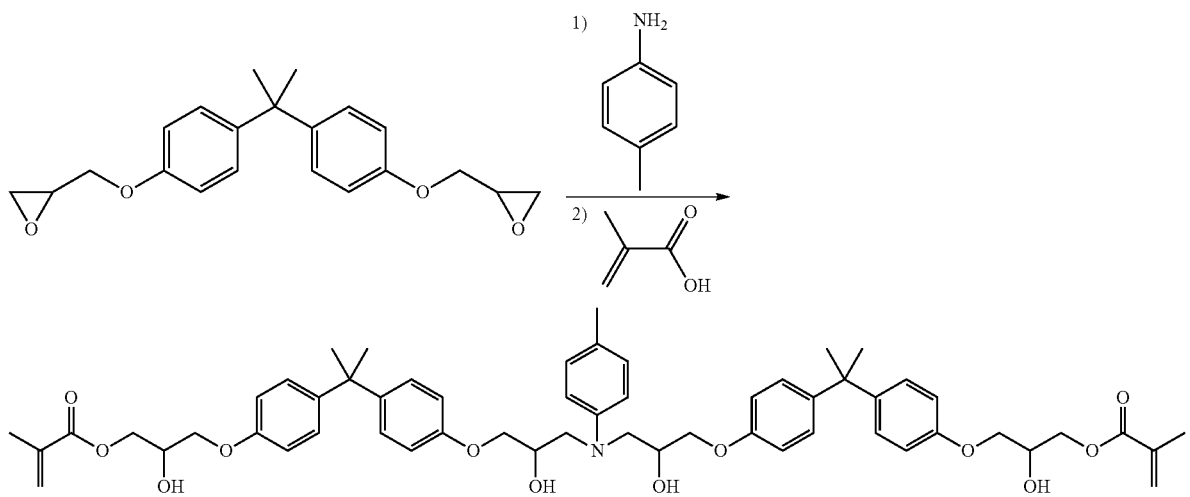

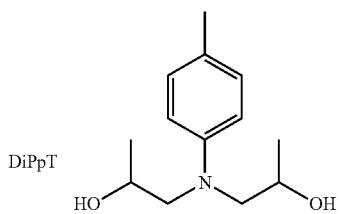

DiPpT

The di-iso-propanol-p-toluidine (DiPpT) which is also shown here for the purpose of comparison is a typical tertiary amine, such as is used in the prior art as an accelerator and in WO 12/164020 A1, for example, as part of the UMA-bound DiPpT described therein.

For the synthesis of the amine accelerator, which synthesis is according to the invention, the starting substances are preferably selected from the following groups:

1) The aromatic primary or secondary amine is preferably selected from the group of aromatic primary or secondary amines, in which the aromatic functional group is either unsubstituted or substituted with one or more substituents $R^1$ selected from the group consisting of halogen, pseudohalogen, $C_1$-$C_{20}$ alkyl, hydroxy-$C_1$-$C_{20}$ alkyl, $C_2$-$C_{20}$ alkenyl, hydroxy-$C_2$-$C_{20}$ alkenyl, $C_2$-$C_{20}$ alkynyl, hydroxy-$C_2$-$C_{20}$ alkynyl and phenyl. $R^1$ is preferably selected from the group consisting of halogen, hydroxy-$C_1$-$C_{20}$ alkyl and $C_1$-$C_{20}$ alkyl. $R^1$ is particularly preferably selected from the group consisting of halogen and $C_1$-$C_{20}$ alkyl. $R^1$ is very particularly preferably selected from the group consisting of chlorine, bromine and $C_1$-$C_6$ alkyl, in particular from the group consisting of chlorine, bromine and $C_1$-$C_4$ alkyl. The aromatic functional group of the aromatic primary or secondary amine is substituted with no, one or more substituents $R^1$. The aromatic functional group of the aromatic primary amine is preferably substituted with one, two or three substituents $R^1$, more preferably with one or two substituents $R^1$. The aromatic functional group of the aromatic secondary amine is preferably substituted with no, one, two or three substituents $R^1$, more preferably with no, one or two substituents $R^1$, more preferably with no or one substituent $R^1$.

The aromatic functional group in the aromatic primary or secondary amine is a phenyl functional group or a naphthyl functional group, particularly preferably a phenyl functional group.

In a preferred embodiment, the aromatic primary amine is an alkyl aniline, i.e. it has a phenyl ring as an aromatic functional group, and this carries an $R^1$, which is an alkyl group. Said $R^1$ is preferably a $C_1$-$C_4$ alkyl; more preferably, $R^1$ is methyl and the alkyl aniline is therefore toluidine. In addition, other substituents $R^1$ selected from the groups given above for $R^1$ may also be present. In a preferred embodiment, there is no further $R^1$. In a further preferred embodiment, one or two further $R^1$ are present, more preferably only one further $R^1$ is present. In a preferred embodiment, the further $R^1$ is selected from the group consisting of halogen and $C_1$-$C_{20}$ alkyl. $R^1$ is very particularly preferably selected from the group consisting of chlorine, bromine and $C_1$-$C_6$ alkyl, in particular from the group consisting of chlorine, bromine and $C_1$-$C_4$ alkyl, and very particularly from the group consisting of chlorine and bromine. In a preferred embodiment, the aromatic primary amine is a toluidine halogenated at the aromatic that does not have further substituents $R^1$, or a toluidine halogenated at the aromatic, that carries another $C_1$-$C_4$ alkyl group, preferably another methyl group, at the aromatic. A toluidine halogenated at the aromatic that does not have further substituents $R^1$ is particularly preferred.

In a preferred embodiment, the aromatic secondary amine is an aniline or an alkyl aniline, i.e. it has a phenyl ring as an aromatic functional group, and this carries either no $R^1$ or an $R^1$ which is an alkyl group. In one embodiment, the aromatic secondary amine is an aniline. In another embodiment, the aromatic secondary amine is an alkyl aniline, i.e. it carries an $R^1$, which is an alkyl group. Said $R^1$ is preferably a $C_1$-$C_4$ alkyl: more preferably, $R^1$ is methyl and the alkyl aniline is therefore toluidine. In addition, other substituents $R^1$ selected from the groups given above for $R^1$ may also be present. In a preferred embodiment, there is no further $R^1$. In a further preferred embodiment, one or two further $R^1$ are present, more preferably only one further $R^1$ is present. In a preferred embodiment, the further $R^1$ is selected from the group consisting of halogen and $C_1$-$C_{20}$ alkyl. The further $R^1$ is very particularly preferably selected from the group consisting of chlorine, bromine and $C_1$-$C_6$ alkyl, in particular from the group consisting of chlorine, bromine and $C_1$-$C_4$ alkyl, and very particularly from the group consisting of chlorine and bromine. In a preferred embodiment, the aromatic secondary amine is a toluidine or aniline halogenated at the aromatic that does not have further substituents $R^1$, or is a toluidine or aniline halogenated at the aromatic that carries another $C_1$-$C_4$ alkyl group, preferably another methyl group, at the aromatic. A toluidine or aniline halogenated at the aromatic that does not have further substituents $R^1$ is particularly preferred.

If only one $R^1$ is present, it is preferably in the meta or para position in relation to the amino group. The same applies to the presence of a plurality of $R^1$. If two $R^1$ are present, one of them is preferably in the meta position and the other in the para position. If three $R^1$ are present, at least one of them is preferably in the meta position and one in the para position.

In the secondary amines, the substituent $R^2$ is on the nitrogen, which substituent is present in addition to the aromatics bound to the nitrogen, preferably selected from the group consisting of $C_1$-$C_{20}$ alkyl, hydroxy-$C_1$-$C_{20}$ alkyl, $C_2$-$C_{20}$ alkenyl, hydroxy-$C_2$-$C_{20}$ alkenyl, $C_2$-$C_{20}$ alkynyl and hydroxy-$C_2$-$C_{20}$ alkynyl. $R^2$ is preferably selected from the group consisting of hydroxy-$C_1$-$C_{20}$ alkyl and $C_1$-$C_{20}$ alkyl. $R^2$ is particularly preferably selected from the group consisting of hydroxy-$C_1$-$C_{12}$ alkyl and $C_1$-$C_{12}$ alkyl. $R^2$ is very particularly preferably selected from the group consisting of hydroxy-$C_1$-$C_4$ alkyl and $C_1$-$C_4$ alkyl.

2) The diglycidyl ether is preferably selected from the group consisting of diglycidyl ethers of diols of hydrocarbons having 2 to 20 C atoms, preferably having 4 to 15 C atoms. The hydrocarbons can be branched or unbranched. The hydrocarbons can be aromatic or aliphatic, or a combination thereof. The diols are preferably selected from the group consisting of bisphenols, in particular bisphenol A, bisphenol F, and bisphenol S, neopentyl glycol, ethylene glycol, phenol novolac resin, cresol novolac resin, and 1,4-butanediol. The diglycidyl ether is preferably selected from the group consisting of diglycidyl ether of bisphenol A, diglycidyl ether of bisphenol F, and diglycidyl ether of bisphenol S. The diglycidyl ether is more preferably the diglycidyl ether of bisphenol A. It is also possible to use oligomeric or polymeric diols.

When using secondary amines, it is also possible to use a glycidyl ether from a polyol instead of a glycidyl ether from a diol, i.e. a compound having more than two hydroxyl groups, in particular a triol and a tetraol, i.e. a compound having three or four hydroxyl groups, since there is no risk of highly viscous polymeric compounds forming.

3) The $\alpha,\beta$-unsaturated carboxylic acid is preferably selected from the group consisting of branched and unbranched $C_2$-$C_{10}$ $\alpha,\beta$-unsaturated carboxylic acids, more preferably from the group consisting of branched and unbranched $C_2$-$C_6$ $\alpha,\beta$-unsaturated carboxylic acids. It is particularly preferably selected from the group consisting of tiglic acid ((E)-2,3-dimethylacrylic acid), sorbic acid (hexadienoic acid), crotonic acid (trans-butenoic acid), methacrylic acid and acrylic acid. The $\alpha,\beta$-unsaturated carboxylic acid is more preferably selected from the group consisting of methacrylic acid and acrylic acid. Said $\alpha,\beta$-unsaturated carboxylic acid is even more preferably methacrylic acid.

4) The catalyst can be any catalyst conventionally used to catalyze the reaction of an epoxide with an $\alpha,\beta$-unsaturated carboxylic acid to form the corresponding carboxylic acid ester. The catalyst is preferably a tetraalkylammonium halide, more preferably selected from the group consisting of tetraalkylammonium bromide and tetraalkylammonium chloride. The catalyst is more preferably selected from the group consisting of tetraethylammonium bromide, tetrabutylammonium bromide, tetraethylammonium chloride and tetrabutylammonium chloride. The catalyst is particularly preferably a catalyst used in the examples.

5) The inhibitor which is optionally and preferably actually used can be any inhibitor conventionally used in the synthesis of epoxy (meth)acrylate resins. Suitable inhibitors are described in more detail below.

The preparation process for a reactive amine accelerator according to the invention and for a reactive resin according to the invention that contains said accelerator typically proceeds as follows:

1. Preparation of Reactive Amine Accelerators

A diglycidyl ether (2) is reacted with an $\alpha,\beta$-unsaturated carboxylic acid, for example with (meth)acrylic acid (3) in the presence of a catalyst (4) and one or more primary or secondary aromatic amine(s) (1) (typically at a temperature of 80° C. to 120° C.). The reaction mixture optionally (and preferably) also contains one or more inhibitors (5). In addition, the reaction mixture preferably does not contain any further ingredients. The reactive amine accelerator according to the invention is formed in this reaction. Exemplary reactions are described in the examples. If a secondary amine is used, an ether of higher valence can also be used.

In order to lower the viscosity when using primary anilines such as para-toluidine, the diglycidyl ether can be partially reacted with part of the $\alpha,\beta$-unsaturated carboxylic acid (for example (meth)acrylic acid) before adding the aromatic amine. In the case of para-toluidine, this is described by way of example in the examples.

The equivalent ratio of diglycidyl ether:$\alpha,\beta$-unsaturated carboxylic acid:primary aromatic amine is typically in the range of from 1:0.3:0.8 to 1:2.09:0.01, preferably from 1:0.6:0.7 to 1:2.05:0.05, particularly preferably is approximately 1:1.1:0.5.

The equivalent ratio of diglycidyl ether:$\alpha,\beta$-unsaturated carboxylic acid:secondary aromatic amine is typically in the range of from 1:0.1:2 to 1:2.09:0.01, preferably from 1:0.5: 1.6 to 1:2.05:0.05, particularly preferably is approximately 1:1.1:1.

When a mixture of primary and secondary amine is used, the equivalent value for the mixture of primary and secondary aromatic amine is typically in a range between the equivalent value for the secondary amine (lower limit) and the equivalent value for the primary amine (upper limit). The value for the mixture in this case results from the molar ratio between the primary and secondary amine.

The reaction mixture obtained after the end of the reaction is not further processed, i.e. the reactive amine accelerator is not isolated. Optionally, one or more inhibitors and/or one or more reactive diluents are added to the reaction mixture after completion of the reaction to the reactive amine accelerator.

2. Preparation of the Backbone Resin/Reactive Resin Masterbatch

A diglycidyl ether, for example bisphenol A diglycidyl ether, and an $\alpha,\beta$-unsaturated carboxylic acid, for example methacrylic acid, are reacted in the presence of a catalyst and an inhibitor (which is used to stabilize the backbone resin formed by the polymerization). The backbone resin was created hereby.

The reaction mixture obtained after completion of the reaction is referred to as a reactive resin masterbatch. This is not further processed, i.e. the backbone resin is not isolated.

3. Preparation of the Reactive Resin

The reaction mixture from the preparation of the reactive amine accelerator is mixed with a backbone resin or reactive resin masterbatch, for example the reaction mixture from the preparation of the backbone resin/reactive resin masterbatch described under section 2, one or more reactive diluents and one or more inhibitors.

Two or more reactive amine accelerators are optionally used.

The order in which the individual components of the reactive resin are mixed together is not relevant. Typically, the reactive amine accelerator is initially provided and then the reactive resin masterbatch, the reactive diluent, and the inhibitor are added in succession.

Typically, the reactive amine accelerator and the backbone resin or the reactive resin masterbatch are prepared separately from one another and are mixed with one another to prepare the reactive resin. This applies in particular to the preparation of urethane (meth)acrylate-based reactive resins. In a further embodiment, however, the reactive resin is prepared by first preparing the reactive amine accelerator and then the backbone resin in succession in the same vessel, i.e. by carrying out a multi-stage one-pot reaction. This applies in particular to the preparation of epoxy (meth) acrylate-based reactive resins. In a further embodiment, the reactive resin is prepared by first preparing the reactive amine accelerator and part of the backbone resin in a one-step one-pot reaction, and then subsequently preparing the further part of the backbone resin in the same vessel.

This also applies to the preparation of epoxy(meth) acrylate-based reactive resins. In yet another embodiment, individual components of the reactive resin, in particular thermally stable and non-reactive components, are added to the reaction mixture for preparation of the reactive amine accelerator, even before the reaction to the reactive amine accelerator begins.

This produces the epoxy (meth)acrylate or urethane (meth)acrylate reactive resin with the reactive amine accelerator according to the invention.

A seventh subject matter of the invention is the use of a reactive resin system according to the invention for chemically fastening anchoring means in boreholes or for structural bonding.

Generic Formulas of Reactive Amine Accelerators According to the Invention

A reactive amine accelerator according to the invention, which was prepared using a primary aromatic amine which contains a phenyl functional group as an aromatic functional group, has the following idealized generic formula (I):

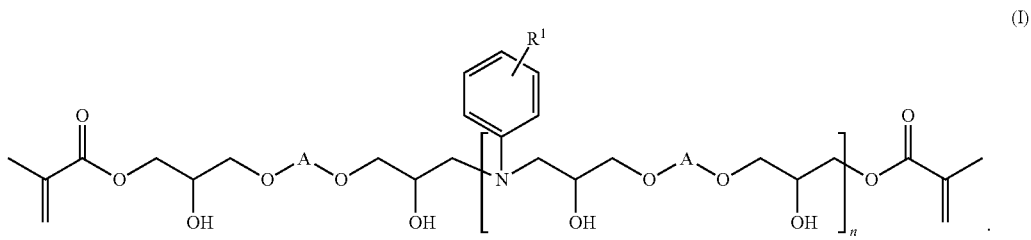

(I)

A first subject matter of the invention is a reactive amine accelerator, in particular an accelerator which has the generic formula (I) or (II). prepared by means of the preparation process described herein, i.e., by (1) an aromatic primary or secondary amine, or a mixture of two or more of said amines, being reacted with (2) a diglycidyl ether of a diol having 2 to 30 C atoms, and (3) an α,β-unsaturated carboxylic acid, preferably an α,β-unsaturated carboxylic acid selected from the group consisting of tiglic acid, sorbic acid, crotonic acid, methacrylic acid and acrylic acid. The reaction typically takes place in the presence of (4) a catalyst. (5) an inhibitor can optionally be present in the reaction mixture. The opening of the epoxy groups present in the diglycidyl ether leads to the formation of glycerol bridges between the amine and the diol and between the α,β-unsaturated carboxylic acid and the diol. An amine accelerator prepared in this way can also be a mixture of different compounds which are formed in this reaction.

A second subject matter of the invention is a reactive resin containing this reactive amine accelerator.

A third subject matter is a reactive resin component (A) containing a reactive resin according to the invention.

A fourth subject matter is a reactive resin system comprising a reactive resin component (A) according to the invention and a hardener component (B) containing an initiator (such as a peroxide) for curing the backbone resin contained in the reactive resin. The components (A) and (B) are packaged so as to be spatially separated from each other until the reactive resin system is used; a reaction therefore takes place only when the two components are brought into contact with one another.

A fifth subject matter of the invention is a method for preparing the reactive amine accelerator according to the invention.

A sixth subject matter of the invention is the use of a reactive amine accelerator according to the invention, in particular a compound which has the general formula (I) or (II), as an accelerator in a reactive resin.

Formula (I) is idealized because it is not only secondary alcohols that are formed during the opening of the epoxide (typically approximately 80% are secondary), and because a certain irregular distribution of the monomers in the formula is possible.

$R^1$ is optional in the formula (I), i.e. the phenyl functional group in formula (I) can also be unsubstituted. As already described above, in the case of a primary aromatic amine, the aromatic functional group, in this case the phenyl functional group, is preferably substituted with one, two or three functional groups $R^1$.

In the generic formula (I) shown, the phenyl ring is a placeholder for an aromatic functional group.

In formula (I), the substituent $R^1$ which is optionally present on the aromatic functional group is in the ortho-, meta- or para-position relative to the nitrogen N, specifically in the same position as in the free amine which was used for the preparation. The meta- and para-positions are preferred. $R^1$ is the same substituent in the bound amine as in the free primary amine which was used to prepare the bound amine.

In the generic formula (I) shown, n is a whole number from 1 to 20, preferably from 1 to 10, more preferably from 1 to 7, and n is particularly preferably a whole number from 1 to 5, very particularly preferably from 1 to 3. It is clear from the preparation method for the amine accelerator that, in the amine accelerator resulting from the synthesis according to the invention (which can be a mixture of molecules having different values n), the value n is an average value calculated from the individual values for all molecules and therefore can also be a non-whole number. The average value of n for the amine accelerator is preferably a value from approximately 0.9 to approximately 10, more preferably from approximately 1 to approximately 7, and particularly preferably from approximately 1 to approximately 5. Very particularly preferably, n is a value from approximately 2 to approximately 3, for example approximately 2.7.

The value of n is determined by means of gel permeation chromatography (GPC; column (Polymer Standard Service; modified styrene-divinylbenzene copolymer network): PSS 5 μm SDV 50 Å 100 Å 1000 Å; eluent: THF; calibration standard: polystyrene) and the following formula ($M_w$: mass average molecular weight; M: molecular weight, calculated using n=1):

$$\langle n \rangle = \frac{Mw \; (GPC)}{M \; (\text{calculated using } n = 1)}$$

For reasons of process technology, higher molecular weights and molecular weight distributions are advantageous, which also has advantages for REACH registration.

In the generic formula (I) shown, A represents the functional group of the diol contained in the diglycidyl ether. The diols used according to the invention are defined above.

In the generic formula (II) shown, $R^1$ has the meaning given above.

A reactive amine accelerator according to the invention, which was prepared using a secondary aromatic amine which contains a phenyl functional group as an aromatic functional group, has the following generic formula (II):

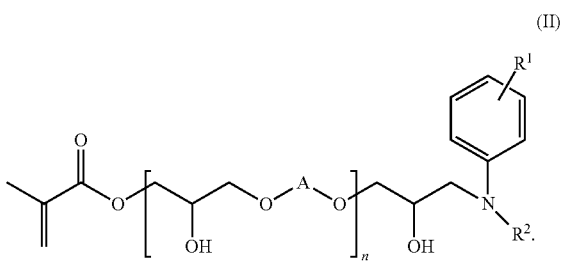

(II)

In formula (II), the substituent $R^1$ which is optionally present on the aromatic functional group is in the ortho-, meta- or para-position relative to the nitrogen N, specifically in the same position as in the free amine which was used for the preparation. The meta- and para-positions are preferred. $R^1$ and $R^2$ are the same substituent in the bound amine as in the free secondary amine which was used to prepare the bound amine.

In the generic formula (II) shown, n is a whole number from 1 to 10, preferably from 1 to 5, more preferably from 1 to 2. Particularly preferably, n is a whole number from 1 to 5, very particularly preferably from 1 to 2. It is clear from the preparation method for the glycidyl ether that the value n from the synthesis of the glycidyl ether (which can be a mixture of molecules having different values n) is an average value calculated from the individual values for all molecules and can therefore also be a non-whole number. The average value of n for the amine accelerator is preferably a value from approximately 0.9 to approximately 10, more preferably from approximately 1 to approximately 5, and particularly preferably from approximately 1 to approximately 2. Very particularly preferably, n is a value from approximately 1 to approximately 1.5.

In the generic formula (II) shown, A represents the functional group of the diol contained in the diglycidyl ether. The diols used according to the invention are defined above.

In the generic formula (II) shown, $R^1$ and $R^2$ have the meaning given above.

In the generic formula (II) shown, the phenyl ring is a placeholder for an aromatic functional group.

A reactive amine accelerator according to the invention, which was prepared using neopentyl glycol and a secondary aromatic amine, has the following formula, for example, for n=1:

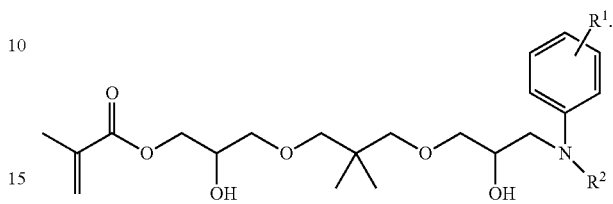

For a better understanding of the invention, the following explanations of the terminology used herein are considered useful.

Within the meaning of the invention:

"backbone resin" means a typically solid or high-viscosity radically polymerizable resin which cures by means of polymerization (e.g. after addition of an initiator in the presence of an accelerator, which according to the invention is the reactive amine accelerator);

"reactive resin masterbatch" means the reaction product of the reaction for preparing the backbone resin, i.e. a mixture of backbone resin, an inhibitor and other constituents (e.g. a catalyst) of the reaction mixture:

"reactive resin" means a mixture of a reactive resin masterbatch, one or more inhibitors, a reactive diluent and optionally further additives; the reactive resin is typically liquid or viscous and can be further processed to form a reactive resin component; the reactive resin is also referred to herein as a "resin mixture;"

"inhibitor" means a substance which suppresses unwanted radical polymerization during the synthesis or storage of a resin or a resin-containing composition (these substances are also referred to in the art as "stabilizers"), or which delays the radical polymerization of a resin after addition of an initiator, usually in conjunction with an accelerator (these substances are also referred to in the art as "inhibitors"—the relevant meaning of the term is apparent from the context);

"initiator" means a substance which (usually in combination with an accelerator) forms reaction-initiating radicals;

"accelerator" means a reagent which reacts with the initiator such that, even at low temperatures, larger amounts of radicals are produced by the initiator, or means a reagent which catalyzes the decomposition reaction of the initiator;

"amine accelerator," means an accelerator based on an amine, in particular an aromatic amine;

"reactive amine accelerator" means an amine accelerator that contains one or two α,β-unsaturated carboxylic acid ester groups;

"co-accelerator" means a reagent which intervenes in the acceleration reaction either catalytically or stoichiometrically, for example, to rebuild the accelerator, moderate radical production per unit of time, further lower the acceleration temperature, or effect a combination of these or other effects;

"reactive diluents" means liquid or low-viscosity monomers and backbone resins which dilute other backbone resins or the reactive resin masterbatch and thereby impart the viscosity necessary for application thereof, which contain functional groups capable of reacting with the backbone resin, and which for the most part become a constituent of the cured composition (e.g. of the mortar) in the polymerization (curing); reactive diluents are also referred to as co-polymerizable monomers;

"gel time," $t_{g25°\,C.}$, means the time (t) of the curing phase of a reactive resin ($t_{hg25°\,C.}$), as defined herein, or a reactive resin component ($t_{mg25°\,C.}$), as defined herein, in which the temperature is increased from a starting temperature of 25° C. at a gel time measurement to 50° C.; a method for determining the gel time is described in the examples;

"maximum reactivity temperature $T_{max}$" means the temperature at which the temperature profile passes through a maximum during a reactivity measurement (for example the gel time measurement described in the examples);

"completion of the reaction" or "reaction end" or "reaction completion" mean the point in time at which a reaction was completely executed; this is generally recognizable in the case of a chemical reaction, such as the reaction for preparing the backbone resin, because the exothermicity related to the reaction has ended;

"reactive resin component" means a liquid or viscous mixture of reactive resin and fillers and optionally further components, e.g. additives; typically, the reactive resin component is one of the two components of a two-component reactive resin system for chemical fastening;

"hardener component" means a composition containing an initiator for the polymerization of a backbone resin; the hardener component may be solid or liquid and may contain, in addition to the initiator, a solvent and fillers and/or additives; typically the hardener component, in addition to the reactive resin component, is the other of the two components of a two-component reactive resin chemical fastening system;

"two-component system" or "two-component reactive resin system" a reactive resin system comprising two separately stored components, a reactive resin component (A) and a hardener component (B), so that a curing of the backbone resin contained in the reactive resin component only takes place after the two components are mixed;

"multi-component system" or "multi-component reactive resin system" a reactive resin system comprising a plurality of separately stored components, including a reactive resin component (A) and a hardener component (B), so that curing of the backbone resin contained in the reactive resin component only takes place after all of the components are mixed;

"(meth)acrylic . . . / . . . (meth)acrylic . . . " means both the "methacrylic . . . / . . . methacrylic" and the "acrylic . . . / . . . acrylic . . . " compounds; "methacrylic . . . / . . . methacrylic" compounds are preferred in the present invention;

"epoxy (meth)acrylate" means an epoxy resin which has acrylate or methacrylate groups and is essentially free of epoxy groups;

"alkyl" means a saturated hydrocarbon functional group that can be branched or unbranched; preferably a $C_1$-$C_{20}$ alkyl, particularly preferably a $C_1$-$C_4$ alkyl, i.e. an alkyl selected from the group consisting of methyl, ethyl, n-propyl, iso-propyl, n-butyl, iso-butyl, and tert-butyl; methyl, ethyl and tert-butyl are particularly preferred and methyl is very particularly preferred;

"hydroxyalkyl" means an alkyl carrying at least one hydroxyl group as a substituent; preferably a hydroxyl group;

"alkenyl" means an unsaturated hydrocarbon functional group having at least one and at most five double bonds, preferably one, which can be branched or unbranched; preferably a $C_2$-$C_{20}$ alkenyl, particularly preferably a $C_2$-$C_6$ alkenyl, i.e. an alkenyl selected from the group consisting of ethenyl, propenyl, butenyl, pentenyl and hexenyl; ethenyl, propenyl and butenyl are particularly preferred, and ethenyl is very particularly preferred;

"hydroxy-alkenyl" means an alkenyl which carries at least one hydroxyl group as a substituent, preferably a hydroxyl group;

"alkynyl" means an unsaturated hydrocarbon functional group having at least one and at most five triple bonds, preferably one which can be branched or unbranched; preferably a $C_2$-$C_{20}$ alkynyl, particularly preferably a CrCe alkynyl, i.e. an alkynyl selected from the group consisting of ethynyl, propynyl, butynyl, pentynyl and hexynyl; ethynyl, propynyl and butynyl are particularly preferred, and ethenyl is very particularly preferred:

"hydroxy-alkynyl" means an alkynyl which carries at least one hydroxyl group as a substituent; preferably a hydroxyl group;

"cold curing" means that a resin mixture or a reactive resin system can cure completely at room temperature;

"a," "an," "any," as the article preceding a class of chemical compounds, e.g. preceding the word "epoxy methacrylate," means that one or more compounds included in this class of chemical compounds, e.g. various epoxy methacrylates, may be intended. In a preferred embodiment, this article means only a single compound;

"at least one" numerically means "one or more." In a preferred embodiment, the term numerically means "one;"

"contain," "comprise," and "include" mean that further constituents may be present in addition to those mentioned. These terms are intended to be inclusive and therefore also encompass "consist of." "Consist of" is intended to be exclusive and means that no further constituents may be present. In a preferred embodiment, the terms "contain," "comprise," and "include" mean the term "consist of;"

"approximately" or "approx." before a numerical value means a range of ±5% of this value, preferably ±2% of this value, more preferably ±1% of this value, particularly preferably ±0% of this value (i.e. exactly this value);

a range limited by numbers, e.g. "from 80° C. to 120° C.," means that the two extreme values and any value within this range are disclosed individually.

All standards cited in this text (e.g. DIN standards) were used in the version that was current on the filing date of this application.

The reactive amine accelerator according to the invention is prepared as described above, by (1) an aromatic primary or secondary amine being reacted with (2) a diglycidyl ether and (3) an α,β-unsaturated carboxylic acid. The reaction typically takes place in the presence of (4) a catalyst. (5) an inhibitor can optionally be present in the reaction mixture. The starting compounds are mixed and reacted with one another. Typically, all preparation steps are carried out while stirring, but other types of mixing are also conceivable. After the reaction for preparing the reactive amine accelerator has finished, further components, in particular the backbone resin, are added for the subsequent preparation of the reactive resin.

Alternatively, individual components of the reactive resin, in particular thermally stable and non-reactive components, can be added to the reaction mixture for preparation of the reactive amine accelerator, even before the reaction to the reactive amine accelerator begins. However, it is preferable for these other components to be added to the amine accelerator after completion of the reaction to the backbone resin.

A reactive amine accelerator according to the invention is preferably a compound of formula (I) or (II), as shown above. If both a primary and secondary aromatic amine were used to prepare the reactive amine accelerator according to the invention, the reactive amine accelerator according to the invention contains both compounds of formula (I) and of the formula (II).

A reactive resin according to the invention contains at least one reactive amine accelerator according to the invention, at least one backbone resin, at least one reactive diluent and at least one inhibitor. Since the reactive amine accelerator and the backbone resin are used, typically without isolation, for preparing the reactive resin after their preparation, further constituents are also generally present in the reactive resin according to the invention, which further constituents are contained in the reaction mixture, in addition to the reactive amine accelerator, and are contained in the reactive resin masterbatch, in addition to the backbone resin.

In a preferred subject matter of the invention, the reactive resin according to the invention contains a mixture of two or more, preferably two, reactive amine accelerators according to the invention.

The accelerator combinations described in the examples characterize a preferred embodiment of the invention.

According to the invention, suitable backbone resins are ethylenically unsaturated compounds, compounds which have carbon-carbon triple bonds, and thiol-yne/ene resins, as are known to the person skilled in the art.

Of these compounds, the group of ethylenically unsaturated compounds is preferred, which group comprises styrene and derivatives thereof, (meth)acrylates, vinyl esters, unsaturated polyesters, vinyl ethers, allyl ethers, itaconates, dicyclopentadiene compounds and unsaturated fats, of which unsaturated polyester resins and vinyl ester resins are particularly suitable and are described, for example, in the applications EP 1 935 860 A1, DE 195 31 649 A1 and WO 10/108939 A1. Vinyl ester resins are in this case most preferred due to the hydrolytic resistance and excellent mechanical properties thereof.

Examples of suitable unsaturated polyesters which can be used in the resin mixture according to the invention are divided into the following categories, as classified by M. Malik et al. in J. M. S.—Rev. Macromol. Chem. Phys., C40 (2 and 3), p. 139-165 (2000):

(1) ortho-resins: these are based on phthalic anhydride, maleic anhydride or fumaric acid and glycols, such as 1,2-propylene glycol, ethylene glycol, diethylene glycol, triethylene glycol, 1,3-propylene glycol, dipropylene glycol, tripropylene glycol, neopentyl glycol or hydrogenated bisphenol-A;

(2) iso-resins: these are prepared from isophthalic acid, maleic anhydride or fumaric acid and glycols. These resins can contain higher proportions of reactive diluents than the ortho resins;

(3) bisphenol A fumarates: these are based on ethoxylated bisphenol A and fumaric acid;

(4) HET acid resins (hexachloroendomethylene tetrahydrophthalic acid resins): are resins obtained from chlorine/bromine-containing anhydrides or phenols during the preparation of unsaturated polyester resins.

In addition to these resin classes, what are referred to as dicyclopentadiene resins (DCPD resins) can also be distinguished as unsaturated polyester resins. The class of DCPD resins is either obtained by modifying one of the abovementioned resin types by means of a Diels-Alder reaction with cyclopentadiene, or said resins are alternatively obtained by means of a first reaction of a diacid, for example maleic acid, with dicyclopentadiene and then by means of a second reaction of the usual preparation of an unsaturated polyester resin, the latter being referred to as a DCPD male resin.

The unsaturated polyester resin preferably has a molecular weight Mn in the range of 500 to 10,000 daltons, more preferably in the range of 500 to 5000 and even more preferably in the range of 750 to 4000 (according to ISO 13885-1). The unsaturated polyester resin has an acid value in the range of 0 to 80 mg KOH/g resin, preferably in the range of 5 to 70 mg KOH/g resin (according to ISO 2114-2000). If a DCPD resin is used as the unsaturated polyester resin, the acid value is preferably 0 to 50 mg KOH/g resin.

In the context of the invention, vinyl ester resins are oligomers or polymers having at least one (meth)acrylate end group, what are referred to as (meth)acrylate-functionalized resins, which also include urethane (meth)acrylate resins and epoxy (meth)acrylates, which are particularly preferred.

Vinyl ester resins which have unsaturated groups only in the end position are obtained, for example, by reacting epoxy oligomers or polymers (for example bisphenol A digylcidyl ether, phenol novolac-type epoxides or epoxy oligomers based on tetrabromobisphenol A) with (meth)acrylic acid or (meth)acrylamide, for example. Preferred vinyl ester resins are (meth)acrylate-functionalized resins and resins which are obtained by reacting epoxy oligomers or polymers with methacrylic acid or methacrylamide, preferably with methacrylic acid. Examples of compounds of this kind are known from the applications U.S. Pat. Nos. 3,297,745 A, 3,772,404 A, 4,618,658 A, GB 2217722 A1, DE 3744390 A1 und DE 4131457 A1.

In this context, reference is made to the application US 2011071234 A1, the content of which is hereby incorporated into this application.

The vinyl ester resin preferably has a molecular weight Mn in the range of 500 to 3000 daltons, more preferably 500 to 1500 daltons (according to ISO 13885-1). The vinyl ester resin has an acid value in the range of 0 to 50 mg KOH/g resin, preferably in the range of 0 to 30 mg KOH/g resin (according to ISO 2114-2000).

Ethoxylated bisphenol A di(meth)acrylate having a degree of ethoxylation of 2 to 10, preferably of 2 to 4, difunctional, trifunctional or higher functional urethane (meth)acrylate oligomers, or mixtures of these curable constituents are particularly suitable as vinyl ester resin.

The known reaction products of di- or polyisocyanates and hydroxyalkylmethylacrylates, as described, for example, in DE 2 312 559 A1, adducts of (di)isocyanates and 2,2-propane bis[3-(4-phenoxy)-1,2-hydroxypropane-1- methacrylate] according to US-PS 3 629 187, and the adducts of isocyanates and methacryloyl alkyl ethers, alkoxybenzenes or alkoxycycloalkanes, as described in EP 44352 A1, are very particularly suitable. In this context, reference is made to DE 2312559 A1, DE 19902685 A1, EP 0684906 A1, DE 4111828 A1 and DE 19961342 A1. Of course, mixtures of suitable monomers can also be used.

All of these resins that can be used according to the invention can be modified according to methods known to a person skilled in the art, for example to achieve lower acid numbers, hydroxide numbers or anhydride numbers, or can be made more flexible by introducing flexible units into the backbone, and the like.

In addition, the resin may contain other reactive groups that can be polymerized with a radical initiator, such as peroxides, for example reactive groups derived from itaconic acid, citraconic acid and allylic groups and the like, as described, for example, in WO 2010/108939 A1 (itaconic acid ester).

The percentual proportion (in wt. % of the reactive resin) of backbone resin in the reactive resin according to the invention is advantageously greater than approximately 5%, preferably greater than approximately 15%, and particularly preferably greater than approximately 20%. The percentual proportion (in wt. % of the reactive resin) of backbone resin in the reactive resin is advantageously approx. 5% to approx. 90%, preferably approx. 8% to approx. 80%, more preferably approx. 10% to approx. 60%, more preferably approx. 20% to approx. 55%, even more preferably approx. 25% to approx. 55%, particularly preferably approx. 25% to approx. 50%, and very particularly preferably approx. 28% to approx. 45%.

The proportion (in mmol amine per 100 g of the reactive resin) of reactive amine accelerator according to the invention in the reactive resin according to the invention is 0.5 to 50, preferably 1 to 20, particularly preferably 5 to 15 mmol amine/100 g of reactive resin. If a mixture of a plurality of reactive amine accelerators according to the invention is used in the reactive resin according to the invention, the proportion relates to the mixture.

One or more inhibitors are present in the reactive resin according to the invention, both to stabilize the reactive resin or the reactive resin component (A) containing the reactive resin, or other compositions containing the reactive resin, and for adjusting the resin reactivity.

The inhibitors which are conventionally used for radically polymerizable compounds, as are known to a person skilled in the art, are suitable for this purpose. These inhibitors are preferably selected from phenolic inhibitors and non-phenolic inhibitors, in particular phenothiazines.

Phenols, such as 2-methoxyphenol, 4-methoxyphenol, 2,6-di-tert-butyl-4-methylphenol, 2,4-di-tert-butylphenol, 2,6-di-tert-butylphenol, 2,4,6-trimethylphenol, 2,4,6-tris(dimethylaminomethyl)phenol, 4,4'-thio-bis(3-methyl-6-tert-butylphenol), 4,4'-isopropylidenediphenol, 6,6'-di-tert-butyl-4,4'-bis(2,6-di-tert-butylphenol), 1,3,5-trimethyl-2,4,6-tris(3,5-di-tert-butyl-4-hydroxybenzyl)benzene, 2,2'-methylene-di-p-cresol, catechols such as pyrocatechol, and catechol derivatives such as butylpyrocatechols such as 4-tert-butylpyrocatechol and 4,6-di-tert-butylpyrocatechol, hydroquinones such as hydroquinone, 2-methylhydroquinone, 2-tert-butylhydroquinone, 2,5-di-tert-butylhydroquinone, 2,6-di-tert-butylhydroquinone, 2,6-dimethylhydroquinone, 2,3,5-trimethylhydroquinone, benzoquinone, 2,3,5,6-tetrachloro-1,4-benzoquinone, methylbenzoquinone, 2,6-dimethylbenzoquinone, naphthoquinone, or mixtures of two or more thereof, are suitable as phenolic inhibitors. These inhibitors are often a constituent of commercial radically-curing reactive resin components.

Phenothiazines such as phenothiazine and/or derivatives or combinations thereof, or stable organic radicals such as galvinoxyl and N-oxyl radicals, in particular of the piperidinyl-N-oxyl or tetrahydropyrrole-N-oxyl type, are preferably considered as non-phenolic inhibitors, such as aluminum-N-nitrosophenylhydroxylamine, diethylhydroxylamine, oximes such as acetaldoxime, acetone oxime, methyl ethyl ketoxime, salicyloxime, benzoxime, glyoximes, dimethylglyoxime, acetone-O-(benzyloxycarbonyl)oxime, TEMPOL, TEMPO and the like.

Furthermore, pyrimidinol or pyridinol compounds substituted in para-position to the hydroxyl group, as described in the patent DE 10 2011 077 248 B1, can be used as inhibitors.

Examples of stable N-oxyl radicals which can be used are those described in DE 199 56 509 A1 and DE 195 31 649 A1. Stable nitroxyl radicals of this kind are of the piperidinyl-N-oxyl or tetrahydropyrrole-N-oxyl type, or are a mixture thereof.

Preferred stable nitroxyl radicals are selected from the group consisting of 1-oxyl-2,2,6,6-tetramethylpiperidine, 1-oxy-2,2,6,6-tetramethylpiperdin-4-ol (also referred to as TEMPOL), 1-oxyl-2,2,6,6-tetramethylpiperidin-4-one (also referred to as TEMPON), 1-oxyl-2,2,6,6-tetramethyl-4-carboxyl-piperidine (also referred to as 4-carboxy-TEMPO), 1-oxyl-2,2,5,5-tetramethylpyrrolidine, 1-oxyl-2,2,5,5-tetramethyl-3-carboxylpyrrolidine (also referred to as 3-carboxy-PROXYL) and mixtures of two or more of said compounds, 1-oxyl-2,2,6,6-tetramethylpiperidin-4-ol (TEMPOL) being particularly preferred.

The inhibitor or inhibitors are preferably selected from the group consisting of N-oxyl radicals, catechols, catechol derivatives and phenothiazines and a mixture of two or more thereof. The inhibitor or inhibitors selected from the group consisting of tempol, catechols and phenothiazines are particularly preferred. The further inhibitors used in the examples are very particularly preferred, preferably approximately in the amounts stated in the examples.

The inhibitors can be used either alone or as a combination of two or more thereof, depending on the desired properties of the reactive resin. The combination of phenolic and non-phenolic inhibitors is preferred.

The inhibitor or inhibitor mixture is added in conventional amounts known in the art, preferably in an amount of approximately 0.0005 to approximately 2 wt. % (based on the reactive resin, which is ultimately prepared therewith), more preferably from approximately 0.01 to approximately 1 wt. % (based on the reactive resin), even more preferably from approximately 0.05 to approximately 1 wt. % (based on the reactive resin).

The reactive resin according to the invention contains at least one reactive diluent.

Suitable reactive diluents are low-viscosity, radically co-polymerizable compounds, preferably compounds free of labeling.

Suitable reactive diluents are described in the applications EP 1 935 860 A1 and DE 195 31 649 A1. The reactive resin preferably contains, as the reactive diluent, a (meth)acrylic acid ester, aliphatic or aromatic $C_5$-$C_{15}$-(meth)acrylates being particularly preferably selected. Suitable examples include: 2-, 3-hydroxypropyl(meth)acrylate (HP(M)A), 1,2-ethanediol di(meth)acrylate, 1,3-propanediol di(meth)acrylate, 1,3-butanediol di(meth)acrylate, 1,4-butanediol di(meth)acrylate, trimethylolpropane tri(meth)acrylate, phenethyl (meth)acrylate, tetrahydrofurfuryl (meth)acrylate, ethyltriglycol (meth)acrylate, N,N-dimethylaminoethyl (meth)acrylate, N,N-dimethylaminomethyl (meth)acrylate, acetoacetoxyethyl (meth)acrylate, isobornyl (meth)acrylate, 2-ethylhexyl(meth)acrylate, diethyleneglycol di(meth)acrylate, methoxypolyethylene glycol mono(meth)acrylate, trimethylcyclohexyl (meth)acrylate, 2-hydroxyethyl (meth)acrylate, dicyclopentenyloxyethyl (meth)acrylate and/or tricyclopentadienyl di(meth)acrylate, bisphenol-A-(meth)acrylate, novolac epoxy di(meth)acrylate, di-[(meth)acryloyl-maleoyl]-tricyclo-5.2.1.0.$^{26}$-decane, dicyclopentenyl oxy ethyl crotonate, 3-(meth)acryloyl-oxymethyl-tricyclo-5.2.1.0.$^{26}$-decane, 3-(meth)cyclopentadienyl (meth)acrylate, and decalyl-2-(meth)acrylate; PEG-di(meth)acrylate such as PEG200 di(meth)acrylate, tetraethylene glycol di(meth)acrylate, solketal (meth)acrylate, cyclohexyl (meth)acrylate, phenoxyethyl di(meth)acrylate, methoxyethyl (meth)acrylate, tert-butyl (meth)acrylate and norbomyl (meth)acrylate. Methacrylates are preferred over acrylates. Particularly preferred are 2- and 3-hydroxypropyl methacrylate (HPMA), 1,2-ethanediol dimethacrylate, 1,4-butanediol dimethacrylate (BDDMA), 1,3-butanediol dimethacrylate, trimethylolpropane trimethacrylate, acetoacetoxyethyl methacrylate, isobornyl methacrylate, bisphenol A methacrylate, trimethylcyclohexyl methacrylate, 2-hydroxyethyl methacrylate, PEG200 dimethacrylate and norbomyl methacrylate. 1,4-butanediol dimethacrylate and a mixture of 2- and 3-hydroxypropyl methacrylate (HPMA), or a mixture of these three methacrylates are very particularly preferred. A mixture of 2- and 3-hydroxypropyl methacrylate (HPMA) is most preferred. In principle, other conventional radically polymerizable compounds, alone or in a mixture with the (meth)acrylic acid esters, can also be used as reactive diluents, e.g. styrene, α-methylstyrene, alkylated styrenes, such as tert-butylstyrene, divinylbenzene and vinyl and allyl compounds, of which the representatives that are not subject to labeling are preferred. Examples of vinyl or allyl compounds of this kind are hydroxybutyl vinyl ether, ethylene glycol divinyl ether, 1,4-butanediol divinyl ether, trimethylolpropane divinyl ether, trimethylolpropane trivinyl ether, mono-, di-, tri-, tetra- and polyalkylene glycol vinyl ether, mono-, di-, tri-, tetra- and polyalkylene glycol allyl ether, divinyl adipate, trimethylolpropane diallyl ether and trimethylolpropane triallyl ether.

The reactive diluents used in the examples are very particularly preferred, preferably approximately in the amounts stated in the examples.

The reactive diluent(s) is/are preferably present in the reactive resin according to the invention in an amount of from 0 to approx. 80 wt. %, particularly preferably from approx. 10 to approx. 60 wt. %, even more preferably from approx. 20 to approx. 50 wt. %, based on the reactive resin.

The curing of the reactive resin is expediently initiated using a peroxide as an initiator. Any of the peroxides known to a person skilled in the art that are used to cure epoxy (meth)acrylate resins can be used. Peroxides of this kind include organic and inorganic peroxides, either liquid or solid, it also being possible to use hydrogen peroxide. Examples of suitable peroxides are peroxycarbonates (of the formula —OC(O)OO—), peroxyesters (of the formula —C(O)OO—), diacyl peroxides (of the formula —C(O)OOC(O)—), dialkyl peroxides (of the formula —OO—), hydroperoxides (of the formula —OOH), and the like. These may be present as oligomers or polymers. A comprehensive set of examples of suitable peroxides is described, for example, in application US 2002/0091214 A1, paragraph [0018].

The peroxides are preferably selected from the group of organic peroxides. Suitable organic peroxides are: tertiary alkyl hydroperoxides such as tert-butyl hydroperoxide and other hydroperoxides such as cumene hydroperoxide, peroxyesters or peracids, such as tert-butyl peresters (e.g. tert-butyl peroxybenzoate), benzoyl peroxide, peracetates and perbenzoates, lauroyl peroxide, including (di)peroxyesters, perethers, such as peroxy diethyl ethers, and perketones, such as methyl ethyl ketone peroxide. The organic peroxides used as curing agents are often tertiary peresters or tertiary hydroperoxides, i.e. peroxide compounds having tertiary carbon atoms which are bonded directly to an —O—O-acyl or —OOH-group. However, mixtures of these peroxides with other peroxides can also be used according to the invention. The peroxides may also be mixed peroxides, i.e. peroxides which have two different peroxide-carrying units in one molecule. In a preferred embodiment, benzoyl peroxide (BPO) or tert-butyl peroxybenzoate is used for curing.

The peroxide can be used in its pure form or as a constituent of a mixture. It is typically used as a constituent of a mixture, in particular as a constituent of a hardener component (B) of a reactive resin system. The hardener component used in the examples, or a hardener component having the same constituents is particularly preferred.

The present invention also relates to a reactive resin system consisting of a reactive resin component (A) and a hardener component (B). The reactive resin component (A) alone is also a subject of the present invention. Said reactive resin component (A) contains the reactive resin according to the invention.

The reactive resin component (A) according to the invention may contain fillers and/or additives in addition to the reactive resin of the invention. It should be noted that some substances can be used as a filler and, can be used, optionally in a modified form, as an additive. For example, fumed silica is preferably used as a filler in the polar, non-after-treated form thereof, and is preferably used as an additive in the non-polar, after-treated form thereof. In cases in which exactly the same substance can be used as a filler or an additive, the total amount thereof should not exceed the upper limit for fillers that is established herein.

In order to produce a reactive resin component for construction applications, in particular chemical fastening, conventional fillers can be added to the reactive resin according to the invention. These fillers are typically inorganic fillers, as described below for example.

The proportion of the reactive resin according to the invention in the reactive resin component is preferably from approx. 10 to approx. 70 wt. %, more preferably from approx. 30 to approx. 60 wt. %, even more preferably from approx. 35 to approx. 50 wt. %, based on the reactive resin component. Accordingly, the total proportion of the fillers and additives is preferably from approx. 90 to approx. 30 wt. %, more preferably from approx. 70 to approx. 40 wt. %, even more preferably from approx. 75 to approx. 50 wt. % based on the reactive resin component.

The fillers used are conventional fillers, preferably mineral or mineral-like fillers, such as quartz, glass, sand, quartz sand, quartz powder, porcelain, corundum, ceramics, talc, silicic acid (e.g. fumed silica, in particular polar, non-after-treated fumed silica), silicates, aluminum oxides (e.g. alumina), clay, titanium dioxide, chalk, barite, feldspar, basalt, aluminum hydroxide, granite or sandstone, polymeric fillers such as thermosets, hydraulically curable fillers such as gypsum, quicklime or cement (e.g. aluminate cement (often referred to as alumina cement) or Portland cement), metals such as aluminum, carbon black, further wood, mineral or organic fibers, or the like, or mixtures of two or more thereof. The fillers may be present in any desired forms, for example as powder or flour, or as molded bodies, for example in cylindrical, annular, spherical, platelet, rod, saddle or crystal form, or else in fibrous form (fibrillar fillers), and the corresponding base particles preferably have a maximum diameter of approximately 10 mm and a minimum diameter of approximately 1 nm. This means that the diameter is approximately 10 mm or any value less than approximately 10 mm, but more than approximately 1 nm. Preferably, the maximum diameter is a diameter of approximately 5 mm in diameter, more preferably approximately 3 mm, even more preferably approximately 0.7 mm. A maximum diameter of approximately 0.5 mm is very particularly preferred. The more preferred minimum diameter is approximately 10 nm, more preferably approximately 50 nm, very preferably approximately 100 nm. Diameter ranges resulting from combination of this maximum diameter and minimum diameter are particularly preferred. However, the globular, inert substances (spherical form) have a preferred and more pronounced reinforcing effect. Core-shell particles, preferably in spherical form, can also be used as fillers.

Preferred fillers are selected from the group consisting of cement, silicic acid, quartz, quartz sand, quartz powder, and mixtures of two or more thereof. For the reactive resin component (A), fillers selected from the group consisting of cement, fumed silica, in particular untreated, polar fumed silica, quartz sand, quartz powder, and mixtures of two or more thereof are particularly preferred. For the reactive resin component (A), a mixture of cement (in particular aluminate cement (often also referred to as alumina cement) or Portland cement), fumed silica and quartz sand is very particularly preferred. For the hardener component (B), fumed silica is preferred as the sole filler or as one of a plurality of fillers; one or more further fillers are particularly preferably present in addition to the fumed silica.

Conventional additives are used as the additives in the reactive resin components (A), i.e. thixotropic agents, such as optionally organically or inorganically after-treated fumed silica (if not already used as a filler), in particular non-polarly after-treated fumed silica, bentonites, alkyl- and methylcelluloses, castor oil derivatives or the like, plasticizers, such as phthalic or sebacic acid esters, antistatic agents, thickening agents, flexibilizers, rheological aids, wetting agents, coloring additives, such as dyes or in particular pigments, for example for different staining of the components for improved control of the mixing thereof, or the like, or mixtures of two or more thereof. Non-reactive diluents (solvents) can also be contained, preferably in an amount of up to 30 wt. %, based on the total amount of the reactive resin component, such as low-alkyl ketones, e.g. acetone, di lower alkyl lower alkanoyl amides, such as dimethylacetamide, lower alkyl benzenes, such as xylenes or toluene, phthalic acid esters or paraffins, water or glycols. Furthermore, metal scavengers in the form of surface-modified fumed silicas can be contained in the reactive resin component. Preferably, at least one thixotropic agent is present as an additive, particularly preferably an organically or inorganically after-treated fumed silica, very particularly preferably a fumed silica after-treated in a non-polar manner, for example, fumed silica after-treated with polydimethylsiloxane (PDMS), particularly preferably the fumed silica used in the examples which is after-treated in a non-polar manner.

In this regard, reference is made to the patent applications WO 2002/079341 A1 and WO 2002/079293 A1 as well as WO 2011/128061 A1, the relevant content of which is hereby incorporated into this application.

In one embodiment, the reactive resin component may additionally contain an adhesion promoter. By using an adhesion promoter, the cross-linking of the borehole wall with the dowel mass is improved such that the adhesion increases in the cured state. This is important for the use of a two-component dowel mass, for example in boreholes drilled using a diamond drill, and increases the failure bond stress. Suitable adhesion promoters are selected from the group of silanes which are functionalized with further reactive organic groups and can be incorporated into the polymer network. This group includes, for example, 3-(meth)acryloyloxypropyttimethoxysilane, 3-(meth)acryloyloxypropyl-triethoxysilane, 3-(meth)acryloyloxymethytrimethoxysilane, 3-(meth)acryloyloxymethyltiethoxysilane, vinyltrimethoxysilane, vinyltrimethoxysilane, functionalized tetraethoxysilane, functionalized tetramethoxysilane, functionalized tetrapropoxysilane, functionalized ethyl or propyl polysilicate, and mixtures of two or more thereof. In this regard, reference is made to the application DE 10 2009 059210 A1, the relevant content of which is hereby incorporated into this application.

The adhesion promoter is expediently contained in amounts of from approximately 1 to approximately 10 wt. %, based on the total weight of the reactive resin component (A).

The present invention also relates to a reactive resin system. The reactive resin system according to the invention is a two- or multi-component system, preferably a two-component system. One of the components is the reactive resin component (A) according to the invention, the other a hardener component (B). The latter contains an initiator by means of which the polymerization of the reactive resin is initiated when the components are mixed.

In a preferred embodiment of the reactive resin system according to the invention, the reactive resin system is a two-component system and the reactive resin component (A) also contains, in addition to the reactive resin according to the invention, a hydraulically setting or polycondensable inorganic compound, in particular cement, and the hardener component (B) also contains, in addition to the initiator for the polymerization of the reactive resin, water. Hybrid mortar systems of this kind are described in detail in DE 4231161 A1. In this case, component (A) preferably contains, as a hydraulically setting or polycondensable inorganic compound, cement, for example Portland cement or alumina cement, cements which are free of transition metal oxide or have a low level of transition metal being particularly preferred. Gypsum can also be used as such or in a mixture with the cement, as a hydraulically setting inorganic compound. Component (A) may also comprise silicatic, polycondensable compounds, in particular soluble, dissolved and/or amorphous silica-containing substances, such as polar, non-after-treated fumed silica, as the polycondensable inorganic compound.

Furthermore, it is preferred that component (A) also contains a thixotropic agent, preferably fumed silica which is after-treated in a non-polar manner, particularly preferably fumed silica after-treated with polydimethylsiloxane (PDMS), very particularly preferably the fumed silica used in the examples which is after-treated in a non-polar manner.

The reactive resin component (A) according to the invention contains:
    the reactive resin according to the invention, as defined above, preferably a preferred embodiment thereof as described above;

at least one hydraulically setting or polycondensable inorganic compound, preferably cement;
at least one further filler, preferably quartz sand; and
at least one thixotropic agent, preferably fumed silica after-treated in a non-polar manner.

In a preferred embodiment, the reactive resin component (A) contains:
the reactive amine accelerator according to the invention;
at least one backbone resin as defined above, preferably urethane (meth)acrylate;
at least one reactive diluent, preferably HPMA and/or BDDMA;
at least one inhibitor as defined above, preferably an inhibitor of the piperidinyl-N-oxyl or tetrahydropyrrole-N-oxyl type, preferably TEMPOL;
at least one hydraulically setting or polycondensable inorganic compound, preferably cement;
at least one further filler, preferably quartz sand; and
at least one thixotropic agent, preferably fumed silica after-treated in a non-polar manner.

In an even more preferred embodiment, the reactive resin component (A) contains:
the reactive amine accelerator according to the invention:
at least one urethane (meth)acrylate, as defined above;
HPMA and/or BDDMA;
at least one inhibitor as defined above of the piperidinyl-N-oxyl or tetrahydropyrrole-N-oxyl type, preferably TEMPOL;
at least one further inhibitor selected from the group consisting of catechols and phenothiazines;
cement; and
at least one thixotropic agent, preferably fumed silica after-treated in a non-polar manner.

In an even more preferred embodiment, the reactive resin component (A) contains:
the reactive amine accelerator according to the invention;
at least one urethane (meth)acrylate, as defined above;
HPMA and/or BDDMA;
TEMPOL;
at least one further inhibitor selected from the group consisting of catechols and phenothiazines;
cement;
fumed silica after-treated in a non-polar manner; and
quartz sand.

The hardener component (B) required for a reactive resin system according to the invention, in addition to the reactive resin component (A), typically contains:
at least one initiator for initiating the polymerization of the reactive resin, preferably benzoyl peroxide (BPO) or tert-butyl peroxybenzoate; and
water.

In a preferred embodiment, the hardener component (B) contains:
at least one initiator for initiating the polymerization of the reactive resin, preferably benzoyl peroxide (BPO) or tert-butyl peroxybenzoate;
at least one filler, preferably fumed silica; and
water.

In a more preferred embodiment, the hardener component (B) contains:
benzoyl peroxide (BPO) or tert-butyl peroxybenzoate for initiating the polymerization of the reactive resin;
fumed silica; and
water.

The reactive resin components (A) and the hardener components (B) in each of these embodiments can be combined with one another as desired.

In a particularly preferred embodiment, the constituents of the reactive resin according to the invention or of the reactive resin component according to the invention are one or more of the constituents which are mentioned in the examples according to the invention. Reactive resins or reactive resin components which contain the same constituents or consist of the same constituents as are mentioned in the individual examples according to the invention, preferably approximately in the proportions stated in said examples, are very particularly preferred.

The reactive resin according to the invention that contains the amine accelerator according to the invention, the reactive resin component (A) according to the invention that contains said reactive resin, and the reactive resin system according to the invention that comprises said reactive resin component as a component are characterized in that the amine accelerator according to the invention is almost completely incorporated into the polymer network during radical curing, due to the olefinic groups. This largely or completely prevents a diffusion of the amine accelerators onto the surface of the cured materials.

The reactive resins according to the invention can be used in many fields in which unsaturated polyester resins, vinyl ester resins or vinyl ester urethane resins are otherwise conventionally used. They can be used in particular for preparing reactive resin mortars for structural applications, such as chemical fastening.

The reactive resin according to the invention is usually used as a resin constituent in the reactive resin component of a multi-component system, typically a two-component system consisting of a reactive resin component (A) and a hardener component (B). This multi-component system may be in the form of a shell system, a cartridge system or a film pouch system. In the intended use of the system, the components are either ejected from the shells, cartridges or film pouches under the application of mechanical forces or by gas pressure, are mixed together, preferably by means of a static mixer through which the constituents are passed, and inserted into the borehole, after which the devices to be fastened, such as threaded anchor rods and the like, are introduced into the borehole which is provided with the hardening reactive resin, and are adjusted accordingly.

A reactive resin system of this kind is used primarily in the construction sector, for example for the repair of concrete, as polymer concrete, as a coating material based on synthetic resin or as cold-curing road marking. It is particularly suitable for chemically fastening anchoring means, such as anchors, reinforcing bars, screws and the like, in boreholes, in particular in boreholes in various substrates, in particular mineral substrates, such as those based on concrete, aerated concrete, brickwork, sand-lime brick, sandstone, natural stone, glass and the like, and metal substrates such as those made of steel. In one embodiment, the substrate of the borehole is concrete, and the anchoring means is made of steel or iron. In another embodiment, the substrate of the borehole is steel, and the anchoring means is made of steel or iron.

Another subject matter of the invention is the use of the reactive resin according to the invention as a constituent of a curable binder or as a curable binder, in particular for fastening anchoring means in boreholes of different subsurfaces and for structural bonding. In one embodiment, the substrate of the borehole is concrete, and the anchoring means is made of steel or iron. In another embodiment, the substrate of the borehole is steel, and the anchoring means is made of steel or iron. The steel borehole preferably has grooves.

The invention is explained in greater detail in the following with reference to a number of examples. All examples and drawings support the scope of the invention. However, the invention is not limited to the specific embodiments shown in the examples and drawings.

EXAMPLES

Unless stated otherwise, all constituents of the compositions that are listed here are commercially available and were used in the usual commercial quality.

Unless stated otherwise, all % and ppm data given in the examples relate to the total weight of the composition described, as a calculation basis.

Preparation Example 1: Preparation of the Reactive Amine Accelerator

From primary anilines and monomeric bisphenol A diglycidyl ether: 1 eq. bisphenol A diglycidyl ether (Epilox® A 19-03; epoxy equivalent weight 183 g/mol; LEUNA-Harze GmbH) was placed completely into the round bottom flask, mixed with 0.5 eq. of a primary aniline. 1.1 eq. methacrylic acid (BASF SE), 0.4 wt. % tetraethylammonium bromide (Merck KGaA), 230 ppm tempol (Evonik Industries AG) and 160 ppm phenothiazine (Allessa GmbH), and temperature-controlled to 100° C. It was stirred until, after approximately 4 h, complete conversion was indicated by thin layer chromatography (stationary phase: silica gel plate; eluent: petroleum ether:ethyl acetate 1:1), i.e. no free amine was detectable.

It was diluted with 20 wt. % of hydroxypropyl methacrylate (HPMA, Evonik Industries AG), post-stabilized with 400 ppm tempol and cooled.

In order to reduce the viscosity, when using para-toluidine as the primary aniline, the diglycidyl ether was partially reacted with 0.5 eq. methacrylic acid at 80° C. for one hour, before the addition of the aniline.

| Primary aniline used | Source | Abbreviation for the resulting amine accelerator |
|---|---|---|
| meta-toluidine | Alfa Aesar | mT |
| para-toluidine | Sigma-Aldrich Chemie GmbH | pT |
| para-bromaniline | TCI Deutschland GmbH | pBrA |
| para-chloranne | TCI Deutschland GmbH | pClA |
| meta-chloro-para-methylaniline | TCI Deutschland GmbH | 3Cl4MeA |
| para-tert-butylaniline | TCI Deutschland GmbH | ptBuA |

From Secondary Anilines and Monomeric Bisphenol a Diglycidyl Ether:

1 eq. bisphenol A diglycidyl ether (Epilox® A 19-03; epoxy equivalent weight 183 g/mol; LEUNA-Harze GmbH) was placed completely into the round bottom flask, mixed with 1 eq. of a secondary aniline, 1.1 eq. methacrylic acid (BASF SE), 0.4 wt. % tetraethylammonium bromide (Merck KGaA), 230 ppm tempol (Evonik Industries AG) and 160 ppm phenothiazine (Allessa GmbH), and temperature-controlled to 100° C. It was stirred until, after approximately 4 h, complete conversion was indicated by thin layer chromatography (stationary phase: silica gel plate; eluent:petroleum ether:ethyl acetate 1:1), i.e. no free amine was detectable.

It was diluted with 20 wt. % HPMA (Evonik Industries AG), post-stabilized with 400 ppm tempol, and cooled.

From Secondary Anilines and Polymeric Bisphenol a Diglycidyl Ether:

0.5 eq. bisphenol A diglycidyl ether (Epilox® A 19-03; epoxy equivalent weight 183 g/mol; LEUNA-Harze GmbH) and 0.4 eq. bisphenol A diglycidyl ether (Epilox® A 50-02; epoxy equivalent weight 485 g/mol; LEUNA-Harze GmbH) were placed completely into the round bottom flask, mixed with 0.9 eq. of a secondary aniline, 1 eq. Methacrylic acid (BASF SE), 0.4 wt. % tetraethylammonium bromide (Merck KgaA), 230 ppm tempol (Evonik Industries AG) and 160 ppm phenothiazine (Allessa GmbH), and temperature-controlled to 100° C. It was stirred until, after approximately 4 h, complete conversion was indicated by thin layer chromatography.

It was diluted with 20 wt. % HPMA (Visiomer® HPMA 98, Evonik Industries AG), post-stabilized with 400 ppm tempol, and cooled.

| Secondary aniline used | Source | Abbreviation for the resulting amine accelerator ("poly" represents accelerators that were prepared using polymeric bisphenol A diglycidyl ether) |
|---|---|---|
| N-methyl-p-toluidine | TCI Deutschland GmbH | NMepT or polyNMepT |
| N-ethyl-p-toluidine | TCI Deutschland GmbH | NEtpT or polyNEtpT |
| N-ethyl-m-toluidine | TCI Deutschland GmbH | NEtmT or polyNEtmT |
| N-ethylaniline | TCI Deutschland GmbH | NEtA |
| N-(2-hydroxyethyl) aniline | TCI Deutschland GmbH | NHOEtA |
| N-dodecyl aniline | TCI Deutschland GmbH | NdodecA |
| N-ethyl-para-chloroaniline | TCI Deutschland GmbH | NEtpClA |

Preparation Example 2: Preparing a Reactive Resin

An amine accelerator prepared according to example 1, or DiPpT, as a comparison, was combined, in an amount corresponding to 7.8 mmol amine/100 g of resin mixture ($c_{tot}$=7.8 mmol/100 g resin), with 15.13 wt. % HPMA (Visiomer® HPMA 98, Evonik Industries AG), 32.75 wt. % 1,4-butanediol dimethacrylate (Visiomer® 1,4-BDDMA, Evonik Industries AG), 0.25 wt. % TBC (tert-butylcatechol, Rhodia), 0.015 wt. % tempol (Evonik Industries AG) and (the amount was adjusted such that the sum of all resin contents was 100%), to make up to 100% UMA/HPMA reactive resin masterbatch (prepared analogously to EP 0 713 015 A1, example A3, in which the amounts were adjusted such that 65 wt. % urethane methacrylate resin was obtained in 35 wt. % HPMA).

Test Example 1: Gel Time and Maximum Reactivity Temperature

The gel time was determined as follows:

The gel time (denoted by $t_{h25°\,C.}$ for the reactive resin) is measured, which time is expressed as the period of time from the time of the addition of an initiator to initialize the curing, to the time when the composition has reached a temperature of 50° C. The measurement was as follows:

The gel time after the addition of the initiator (Perkadox® 20S (Akzo), weight ratio of reactive resin:initiator 100:30) to the reactive resin prepared according to preparation example 2 was determined using a conventional apparatus (Geltimer, WKS Informatik) at a starting temperature of 25° C. For this purpose, the mixture was filled into a test tube after the addition of the initiator, up to a height of 4 cm below the rim, the test tube being kept at a temperature of 25° C. (DIN 16945, DIN EN ISO 9396). A glass rod or spindle was moved up and down in the mixture at 10 strokes per minute. The gel time corresponds to the time period after the addition of the initiator, after which a temperature of 50° C. was measured in the mixture.

The maximum reactivity temperature $T_m a$ corresponds to the maximum of the temperature curve in the gel time measurement. In order to determine this maximum, the gel time measurement was continued after reaching the temperature of 50° C. until the maximum of the temperature curve was exceeded.

The results are shown in the following table:

| Accelerator made of amine | Gel time: $t_{hg,\,25°\,C.}$ | Maximum reactivity temperature: $T_{max}$ |
|---|---|---|
| NMepT | 2.40 min | 168° C. |
| NEtpT | 3.70 min | 162° C. |
| NEtmT | 9 min | 164° C. |
| mT | 21 min | 162° C. |
| pT | 5.4 min | 163° C. |
| NEtA | 22 min | 162° C. |
| NHOEtA | 33 min | 159° C. |
| pBrA | 100 min | 156° C. |
| ptBuA | 11 min | 157° C. |
| NdodecA | 20 min | 158° C. |
| pClA | 72 min | 155° C. |
| 3Cl4MeA | 36 min | 155° C. |
| NEtpCl | 42 min | 158° C. |
| (1:1) NMepT + pBrA | 7.25 min | 165-167° C. |
| (2:1) NMepT + pBrA | 4.15 min | 165° C. |
| (1:1) NEtpT + pBrA | 21 min | 156° C. |
| (1:1:1) NMepT + NEtmT + pBrA | 5.7 min | 159-163° C. |
| (50%, i.e. half the amount of accelerator) NMepT | 6.8 min | 167-168° C. |
| (1:1) NMepT + NEtA | 6.0 min | 163-165° C. |
| (1:1) NMepT + NEtmT | 5.3 min | 164° C. |
| (2:1) NMepT + NEtmT | 3.92 min | 160° C. |
| (3:2) NMepT + NEtmT | 4.16 min | 158° C. |
| NMepT + pBrA (3:2) | 6.22 min | 158° C. |
| polyNMepT | 2.30 min | 157° C. |
| polyNEtpT | 3.60 min | 161° C. |
| polyNEtmT | 9 min | 162° C. |
| polyNMepT + NEtA (1:1) | 5.08 min | 159° C. |
| polyNMepT + NEtmT (3:2) | 3.30 min | 164° C. |
| monomer DiPpT (reference) | 4.9 min | 160° C. |
| UMA-bound DiPpT (prepared according to WO 12/164020) | 29 min | 154° C. |

Conclusions from these Tests:

Structural changes to the nitrogen or the aromatic ring of the aniline or toluidine can greatly change the accelerating effect of the aniline or toluidine.

Regardless of the gel time, all reactive amine accelerators showed high peak temperatures (maximum reactivity temperatures), which indicates very good curing.

Preparation Example 3: Reactive Resin Components (A)

In 39.3 wt. % of a reactive resin prepared according to preparation example 2, 37.7 wt. % quartz sand F32 (Quarzwerke Frechen), 20.5 wt. % aluminate cement Secar® 80 (Kerneos) and 2.5 wt. % fumed silica after-treated in a non-polar manner Cab-O-Sil® 720 (Cabot Rheinfelden) were dispersed in a dissolver under a vacuum. The gel time of the reactive resin component, $t_{mg,25°\,C.}$, was measured using the same method as described in test example 1, the reactive resin component described here being tested instead of the reactive resin from preparation example 2.

| Description | Accelerator (molar ratio) with $c_{tot}$ = 7.8 mmol/ 100 g resin | Gel time: $t_{mg,\,25°\,C.}$ min |
|---|---|---|
| Comparative example 1 | DiPpT | 4.50 |
| Example 1 | NMepT/NEtmT (3/2) | 4.10 |
| Example 2 | NMepT/pBrA (3/2) | 6.60 |
| Example 3 | NMepT/pBrA (2/1) | 4.20 |
| Example 4 | polyNMepT/NEtmT (3/2) | 3.52 |

Test Example 2: Measurement of Bond Stress

A reactive resin system consisting of a reactive resin component (A) prepared according to preparation example 3, and the commercial hardener component HY-110 B (Hilti) used as a hardener component (B) was filled into a plastic cartridge (Ritter GmbH; volume ratio A:B=3:1) having the inside diameter 47 mm (component (A)) or 28 mm (component (B)), and tested as follows:

In order to determine the shear strength (synonym: bond stress) achieved by means of the reactive resin system according to comparative example 1 and according to examples 1 to 4, the mixed reactive resin system (i.e. the mixture of reactive resin component (A) and hardener component (B) in a volume ratio of A:B=3:1) is introduced into a steel sleeve having a defined geometry and a defined fill level of the mortar (embedding depth). An anchor rod was then placed in the center of the steel sleeve filled with the mixture, using a centering aid. After curing at 25° C. and for at least 12 hours, the sample was screwed into a tensile testing machine using a thread adapter (Zwick Roell Z050, 50 kN). The sample was loaded with tensile force at a defined speed until failure. The corresponding load-displacement dependency was continuously recorded. Five individual measurements were carried out in each case, and the mean value of the maximum force upon failure was calculated.

Anchor rods having an M8 thread and steel sleeves having the following geometry were used to carry out the measurements:

Undercut depth: 0.35+/−0.02 mm
Undercut width: 2 mm
Embedding depth: 36 mm
Inner diameter: 12 mm The shear strength determined from these measurements is defined as the quotient of the maximum force upon failure and the shear surface of the anchor rod used (anchor rod M8: 904.3 mm$^2$). The results of the measurements are shown in the following table:

| | Comparative example 1 | Example 1 | Example 2 | Example 3 | Example 4 |
|---|---|---|---|---|---|
| Bond stress [N/mm$^2$] | 16.5 ± 1.3 | 14.2 ± 2.2 | 15.2 ± 2.0 | 12.5 ± 1.0 | 14.3 ± 1.3 |

Conclusion:

Cured reactive resin systems having different reactive amine accelerators (examples 1 to 4) showed a comparable bond stress to reactive resin systems which contained DiPpT as an accelerator (comparative example 1).

Test Example 3: Sedimentation

A comparison of the sedimentation properties was carried out using an accelerated test. The Lumifuge® instrument from LUM GmbH was used for this purpose. The following parameters were used for the method:

| | |
|---|---|
| Light factor | 0.5 |
| Rotation speed | 2055 rpm |
| Polyamide cuvette | 10 mm |
| Temperature | 35° C. |
| 8 channels (parallel measurements) | |
| Time | 255 measurements every 20 s |
| Model | 1120-28 |
| Cuvette fill amount | 1.3 mL |

The following reactive resin components (A) were tested:

| Example | Accelerator (molar ratio) with $c_{tot}$ = 7.8 mmol/ 100 g resin |
|---|---|
| Comparative example 1 | DiPpT |
| Example 5 | NEtpT/NEtmT/pBrA (1/1/1) |
| Example 6 | pBrA |

The following measurement results (mean values from 8 parallel measurements) were achieved:

| | Comparative example 1 | Example 5 | Example 6 |
|---|---|---|---|
| Sedimentation speed [μm/s] | 0.477 ± 0.04 | 0.328 ± 0.03 | 0.338 ± 0.02 |

Conclusion:

Example 5 and example 6 showed a sedimentation rate which is slower by a factor of 1.4, and therefore have an improved shelf life in comparison with comparative example 1.

The invention claimed is:

1. An accelerator for a reactive resin system, prepared by reacting the following components:
  (1) an aromatic primary or secondary amine, or a mixture thereof having the structure:

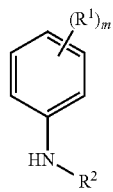

where
  $R^1$ is selected from the group consisting of chlorine, bromine, pseudohalogen, $C_{1-20}$ alkyl, hydroxy-$C_{1-20}$ alkyl, $C_{2-20}$ alkenyl, hydroxyl $C_{2-20}$ alkenyl, $C_{2-20}$ alkynyl, hydroxy $C_{2-20}$ alkynyl and phenyl;
  m=0-3; and
  $R^2$ is selected from the group consisting of H, $C_1$-$C_{20}$ hydroxy-$C_1$-$C_{20}$ alkyl, $C_2$-$C_{20}$ alkenyl, hydroxy-$C_2$-$C_{20}$ alkenyl, $C_2$-$C_{20}$ alkynyl, hydroxy-$C_2$-$C_{20}$ alkynyl and aryl;
  (2) a diglycidyl ether of a diol or polyol, which has 2 to 20 C atoms; and
  (3) an α,β-unsaturated carboxylic acid, selected from the group consisting of branched and unbranched $C_2$-$C_{10}$-α,β-unsaturated carboxylic acids,
  wherein an opening of the epoxy groups present in the diglycidyl ether leads to formation of glycerol bridges between the amine and the diol and between the α,β-unsaturated carboxylic acid and the diol, which results in a finished accelerator.

2. The accelerator for a reactive resin system according to claim 1, wherein the aromatic primary or secondary amine is a primary amine which is selected from the group consisting of an unsubstituted toluidine, a toluidine halogenated with at least one of chlorine and bromine at an aromatic group that does not have further substituents, and a toluidine halogenated with at least one of chlorine and bromine at an aromatic group that carries another $C_1$-$C_4$ alkyl group at the aromatic group, and wherein the diglycidyl ether is a diglycidyl ether of a diol.

3. The accelerator for a reactive resin system according to claim 1, wherein the diol is selected from the group consisting of bisphenols, neopentyl glycol, ethylene glycol, phenol novolac resin, cresol novolac resin, and 1,4-butanediol.

4. The accelerator for a reactive resin system according to claim 1, wherein the α,β-unsaturated carboxylic acid is selected from the group consisting of tiglic acid, sorbic acid, crotonic acid, methacrylic acid, and acrylic acid.

5. The accelerator for a reactive resin system according to claim 1, wherein the aromatic amine is a primary aromatic amine, and wherein the equivalent ratio of diglycidyl ether:α,β-unsaturated carboxylic acid:primary aromatic amine is in the range of approximately 1:0.3:0.8 to approximately 1:2.09:0.01.

6. The accelerator for a reactive resin system according to claim 1, wherein the aromatic amine is a secondary aromatic amine, and wherein the equivalent ratio of diglycidyl ether:α,β-unsaturated carboxylic acid:secondary aromatic amine is in the range of approximately 1:0.1:2 to approximately 1:2.09:0.01.

7. The accelerator for a reactive resin system according to claim 1, having the formula (I) or (II):

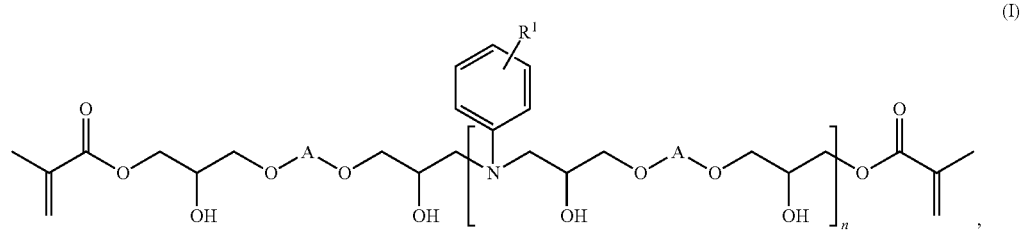

(I)

in which
R¹ is selected from the group consisting of chlorine, bromine, pseudohalogen, $C_1$-$C_{20}$ alkyl, hydroxy-$C_1$-$C_{20}$ alkyl, $C_2$-$C_{20}$ alkenyl, hydroxy-$C_2$-$C_{20}$ alkenyl, $C_2$-$C_{20}$ alkynyl, hydroxy-$C_2$-$C_{20}$ alkynyl, and phenyl, m=0-3;
n is a whole number from 1 to 20; and
A is the functional group of the diol which is comprised in the diglycidyl ether (2);

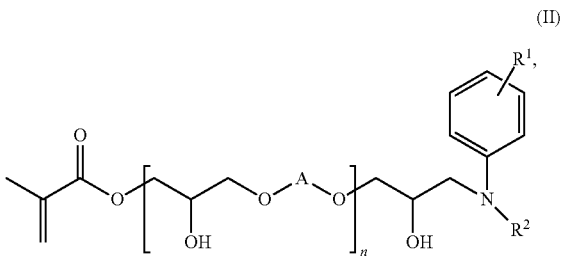

(II)

in which
R¹ is selected from the group consisting of chlorine, bromine, pseudohalogen, $C_1$-$C_{20}$ alkyl, hydroxy-$C_1$-$C_{20}$ alkyl, $C_2$-$C_{20}$ alkenyl, hydroxy-$C_2$-$C_{20}$ alkenyl, $C_2$-$C_{20}$ alkynyl, hydroxy-$C_2$-$C_{20}$ alkynyl, and phenyl;
R² is selected from the group consisting of $C_1$-$C_{20}$ alkyl, hydroxy-$C_1$-$C_{20}$ alkyl; $C_2$-$C_{20}$ alkenyl, hydroxy-$C_2$-$C_{20}$ alkenyl, $C_2$-$C_{20}$ alkynyl, hydroxy-$C_2$-$C_{20}$ alkynyl, and aryl;
m=0-3;
n is a whole number from 1 to 20; and
A is the functional group of the diol which is comprised in the diglycidyl ether (2).

8. The accelerator for a reactive resin system according to claim 7, wherein R¹ is selected from the group consisting of chlorine, bromine, hydroxy-$C_1$-$C_{20}$ alkyl, and $C_1$-$C_{20}$ alkyl.

9. The accelerator for a reactive resin system according to claim 8, wherein R¹ is selected from the group consisting of chlorine, bromine, and $C_1$-$C_6$ alkyl.

10. The accelerator for a reactive resin system according to claim 7, wherein then of formula (I) is a whole number from 1 to 3.

11. The accelerator for a reactive resin system according to claim 7, wherein then of formula (II) is a whole number from 1 to 2.

12. The accelerator for a reactive resin system according to claim 1, wherein the diglycidyl ether is a diglycidyl ether of diols selected from the group consisting of bisphenols, neopentyl glycol, ethylene glycol, phenol novolac resin, cresol novolac resin, and 1,4-butanediol.

13. A reactive resin comprising the accelerator according to claim 1.

14. A reactive resin component (A) for a reactive resin system, comprising the reactive resin according to claim 13.

15. A reactive resin system comprising the reactive resin component (A) according to claim 14, and a hardener component (B) comprising an initiator.

16. The reactive resin system according to claim 15, wherein at least one of the components (A) or (B) comprises an inorganic filler.

17. A method for chemical fastening anchoring in boreholes or for structural bonding, the method comprising:
applying the reactive resin system according to claim 15 to a borehole or a structure.

18. A reactive resin system comprising a reactive resin component (A) and a hardener component (B), wherein the reactive resin component (A) comprises:
at least one accelerator according to claim 1;
at least one backbone resin;
at least one reactive diluent;
at least one inhibitor;
at least one hydraulically setting or polycondensable inorganic compound; and
at least one thixotropic agent,
and the hardener component (B) comprises:
at least one initiator for initiating the polymerization of the reactive resin;
at least one filler; and
water.

19. A method of accelerating the curing of a reactive resin, the method comprising:
curing the reactive resin with the accelerator as defined in claim 1.

* * * * *